(12) United States Patent
Van Hassel

(10) Patent No.: US 10,675,854 B2
(45) Date of Patent: Jun. 9, 2020

(54) ADDITIVE PROCESSING APPARATUS AND METHOD

(71) Applicant: United Technologies Corporation, Hartford, CT (US)

(72) Inventor: Bart A. Van Hassel, Weatogue, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1360 days.

(21) Appl. No.: 14/598,322

(22) Filed: Jan. 16, 2015

(65) Prior Publication Data

US 2016/0207147 A1    Jul. 21, 2016

(51) Int. Cl.
| | |
|---|---|
| *B23K 26/34* | (2014.01) |
| *B23K 26/12* | (2014.01) |
| *B23K 26/14* | (2014.01) |
| *B33Y 30/00* | (2015.01) |
| *B33Y 10/00* | (2015.01) |
| *B22F 3/105* | (2006.01) |
| *B29C 64/364* | (2017.01) |
| *B01D 47/00* | (2006.01) |
| *B29C 64/35* | (2017.01) |
| *B29C 64/153* | (2017.01) |

(52) U.S. Cl.
CPC .............. *B33Y 30/00* (2014.12); *B01D 47/00* (2013.01); *B22F 3/1055* (2013.01); *B29C 64/364* (2017.08); *B33Y 10/00* (2014.12); *B22F 2003/1056* (2013.01); *B22F 2003/1059* (2013.01); *B22F 2201/00* (2013.01); *B22F 2999/00* (2013.01); *B29C 64/153* (2017.08); *B29C 64/35* (2017.08)

(58) Field of Classification Search
CPC ......... B33Y 10/00; B33Y 30/00; B33Y 99/00; B29C 64/20; B29C 64/153; B29C 64/35; B29C 64/364; B22F 2003/1059; B22F 2201/00; B22F 2999/00; B22F 2003/1056; B22F 3/1055; B01D 46/00; B01D 47/00
USPC ....................................................... 219/76.12
See application file for complete search history.

(56) References Cited

U.S. PATENT DOCUMENTS

| | | | | |
|---|---|---|---|---|
| 4,316,157 | A * | 2/1982 | Dosi ....................... | H01S 3/036 372/59 |
| 5,358,696 | A * | 10/1994 | Jahnke ..................... | C01B 3/36 252/373 |
| 5,405,812 | A * | 4/1995 | Bruggendick ......... | B01D 53/08 422/177 |

(Continued)

FOREIGN PATENT DOCUMENTS

| | | | | |
|---|---|---|---|---|
| EP | 2774703 | A1 * | 9/2014 | ............ B22F 3/1055 |
| EP | 2774703 | | 10/2014 | |

*Primary Examiner* — Dana Ross
*Assistant Examiner* — James F Sims, III
(74) *Attorney, Agent, or Firm* — Carlson, Gaskey & Olds, P.C.

(57) ABSTRACT

An additive processing apparatus includes a chamber and an irradiation device that together are operable to additively fabricate an article from a powder layer-by-layer in a work space in the chamber. A gas recirculation loop is connected at a first end thereof to an outlet of the chamber and at a second end thereof to an inlet of the chamber. The gas recirculation loop includes at least one purification device that is configured to remove impurities from a cover gas and generate a clean cover gas.

18 Claims, 3 Drawing Sheets

(56) References Cited

U.S. PATENT DOCUMENTS

| | | | |
|---|---|---|---|
| 7,168,935 B1 | 1/2007 | Taminger et al. | |
| 8,794,263 B2 * | 8/2014 | Scott | B01D 46/0058 137/599.14 |
| 2006/0192322 A1 | 8/2006 | Abe et al. | |
| 2008/0191153 A1 * | 8/2008 | Marganski | B01J 7/00 250/492.21 |
| 2008/0277268 A1 * | 11/2008 | Layman | B22F 9/12 204/164 |
| 2013/0344258 A1 | 12/2013 | Covey | |
| 2014/0178241 A1 | 6/2014 | Mironets et al. | |

\* cited by examiner

ADDITIVE PROCESSING APPARATUS AND METHOD

BACKGROUND

Additive manufacturing typically involves building an article, layer-by-layer, from a powder material by consolidating selected portions of each successive layer of powder until the complete article is formed. Non-consolidated portions of the powder remain as a powder and are later removed. The additive manufacturing process can be conducted in a chamber with an inert gas, under controlled pressure and temperature conditions. A laser beam can be used to melt and consolidate the powder. For aerospace articles, such as airfoils, the powder is typically a metallic alloy powder.

SUMMARY

An additive processing apparatus according to an example of the present disclosure includes a chamber and an irradiation device together operable to additively fabricate an article from a powder layer-by-layer in a work space in the chamber. A gas recirculation loop is connected at a first end thereof to an outlet of the chamber and at a second end thereof to an inlet of the chamber. The gas recirculation loop includes at least one purification device configured to remove impurities from a cover gas and to generate a clean cover gas.

In a further embodiment of any of the present disclosure, the at least one purification device includes a gas scrubber.

In a further embodiment of any of the present disclosure, the at least one purification device includes a particle filter.

In a further embodiment of any of the present disclosure, the particle filter is upstream of the gas scrubber with respect to flow from the first end to the second end.

A further embodiment of any of the present disclosure includes an additional particle filter downstream of the gas scrubber with respect to flow from the first end to the second end.

In a further embodiment of any of the present disclosure, the gas scrubber includes a bed of granules.

In a further embodiment of any of the present disclosure, the gas scrubber includes at least one of activated carbon, magnesium, titanium, and copper.

In a further embodiment of any of the present disclosure, the gas scrubber includes a molecular sieve.

In a further embodiment of any of the present disclosure, the gas recirculation loop splits into first and second passages including, respectively, first and second purification devices, and the first and second passages combine in the gas recirculation loop downstream of the first and second purification devices with respect to flow from the first end to the second end.

In a further embodiment of any of the present disclosure, the gas recirculation loop includes at least one sensor downstream of the at least one purification device with respect to flow from the first end to the second end, the at least one sensor configured to detect a characteristic representative of impurity level of the clean cover gas.

In a further embodiment of any of the present disclosure, the gas recirculation loop includes a heat exchanger downstream of the at least one purification device with respect to flow from the first end to the second end.

A further embodiment of any of the present disclosure includes a cover gas source connected to the chamber for providing new cover gas, and a controller configured to meter an amount of new cover gas with respect to an amount of clean cover gas circulated into the chamber from the gas recirculation loop.

An additive processing method according to an example of the present disclosure includes providing a cover gas in a chamber in connection with additive fabrication of an article in the chamber, the cover gas entraining impurities during the additive fabrication, circulating the cover gas with entrained impurities from the chamber into a gas recirculation loop, removing the entrained impurities from the cover gas in the gas recirculation loop to generate a clean cover gas, and circulating the clean cover gas into the chamber during the additive fabrication.

A further embodiment of any of the present disclosure includes removing gaseous impurities using a gas scrubber.

A further embodiment of any of the present disclosure includes removing solid impurities using a particle filter.

A further embodiment of any of the present disclosure includes removing the solid impurities from the cover gas prior to removing the gaseous impurities from the cover gas.

A further embodiment of any of the present disclosure includes cooling the clean cover gas prior to circulating the clean cover gas into the chamber.

In a further embodiment of any of the present disclosure, the circulating of the clean cover gas into the chamber includes introducing the clean cover gas at a powder bed in the chamber.

An additive processing apparatus according to an example of the present disclosure includes a chamber and an irradiation device that are together operable to additively fabricate an article from a powder layer-by-layer in a work space in the chamber. A gas recirculation loop is connected at a first end thereof to an outlet of the chamber and at a second end thereof to an inlet of the chamber, to purify a cover gas received from the chamber and generate a clean cover gas circulated into the chamber. The gas recirculation loop includes, in flow serial order from the first end to the second end, a particle filter configured to remove solid impurities from the cover gas, a gas scrubber configured to remove gaseous impurities from the cover gas, and a heat exchanger operable to cool the cover gas.

A further embodiment of any of the present disclosure, a cover gas source is connected to the chamber for providing new cover gas, with a controller configured to meter an amount of new cover gas with respect to an amount of clean cover gas circulated into the chamber from the gas recirculation loop.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
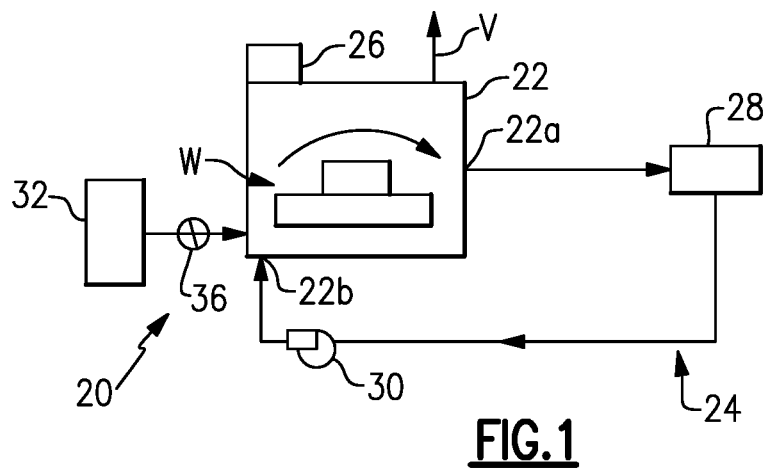
FIG. 1 illustrates an example additive processing apparatus that includes a gas recirculation loop with at least one purification device for removing impurities from a cover gas to generate a clean cover gas.

FIG. 1 schematically illustrates an additive processing apparatus 20. The additive processing apparatus 20 can be used for additive manufacturing or fabrication techniques that involve building an article layer-by-layer from a powder material by consolidating selected portions of each successive layer of powder until the complete article is formed. Additive manufacturing process can include, but are not limited to, selective laser melting, direct metal laser sintering, 3D printing, laser engineered netshaping ("LENS") or laser powder forming. Such a process can be conducted in a chamber 22 with an inert cover gas, such as argon, helium, or a mixture thereof (Ar/He), under controlled pressure and temperature conditions.

Some powders, such as metallic powders, are sensitive to moisture or oxygen in the processing environment, which can cause oxidation during the additive manufacturing process. Additionally, the powder itself may contain minor amounts of impurities, such as moisture, oxygen, nitrogen, or other impurities. These impurities can be released into the inert cover gas during the additive manufacturing process. Additionally, the impurities may build-up and foul components in the equipment, such as optical lens components, used for transmitting a concentrated energy beam. Impurities can also contaminate sensors, cameras, or other components in the chamber 22. To reduce build-up of impurities in the inert cover gas during the process, the gas can be vented and replaced with new inert cover gas. This uses a relatively high amount of the cover gas, especially since additive fabrication can take a long period of time in comparison to processes like welding. In this regard, the additive processing apparatus 20 includes a gas recirculation loop 24 that permits recycling of used cover gas from the chamber 22 by cleaning the cover gas then returning it into the chamber 22. The removal of the impurities can reduce the expenses related to the amount of cover gas used and contamination of components in the chamber 22.

In general, the additive processing apparatus 20 includes the chamber 22 and an irradiation device 26 that together are operable to additively fabricate an article from a powder layer-by-layer in a work space, represented at W, in the chamber 22. Although not limited, the irradiation device 26 can be a laser or the like, that is capable of directing a concentrated energy beam toward the work space to melt and consolidate the selected powder that will be used to fabricate the article. For example, the powder can be, but is not limited to, a metallic alloy powder. With respect to the cover gas that is used during the additive manufacturing process within the chamber 22, the chamber 22 includes a chamber outlet 22a and a chamber inlet 22b. One end of the gas recirculation loop 24 is connected to the outlet 22a of the chamber 22 and the other end of the gas recirculation loop 24 is connected to the inlet 22b of the chamber 22.

The gas recirculation loop 24 includes at least one purification device 28 that is configured to remove impurities from the cover gas to generate a clean cover gas. That is, during an additive manufacturing process within the chamber 22, the cover gas entrains impurities that are then carried in the cover gas through the outlet 22a into the gas recirculation loop 24. The one or more purification devices 28 in the gas recirculation loop 24 serve to condition the used cover gas, thereby cleaning the gas and providing the clean cover gas to be reintroduced into the chamber 22 for the additive manufacturing process. In this regard, the gas recirculation loop 24 can include a blower 30 for facilitating movement of the cover gas through the gas recirculation loop 24. In one further example, the blower 30 is a variable speed compressor to control or overcome pressure drop through the gas recirculation loop 24. Additionally, if pressure drop is a concern, larger diameter piping, shallow adsorbent bed or beds, or both can be used. The purification device or devices 28 can be selected to remove solid impurities, gas impurities, moisture, or combinations thereof.

In a further example, the clean cover gas is selectively introduced back into the chamber 22 at the powder bed during powder layer application, after powder layer application, during powder consolidation, or during any combination of these. If introduced at a location remote from the powder bed, the clean gas may be more likely to pick up impurities that potentially reduce the effectiveness of the clean cover gas before it ever reaches the powder bed. For example, the clean cover gas is provided in a laminar flow stream over the powder bed.

One or more cover gas sources 32 are operable to provide one or more cover gases into the chamber 22, or alternatively into the gas recirculation loop 24. A valve 36 is provided to control flow of the cover gas into the chamber 22. The chamber 22 includes a vent or valve, represented at V, for venting the chamber 22 to facilitate controlling pressure. One or more sensors may be used in the chamber and/or in the gas recirculation loop 24 to detect pressure and facilitate operation of the additive processing apparatus 20. If the cover gas is a mixture of gases, sensors can also be included to monitor and control the composition mixture.

Figure 2:
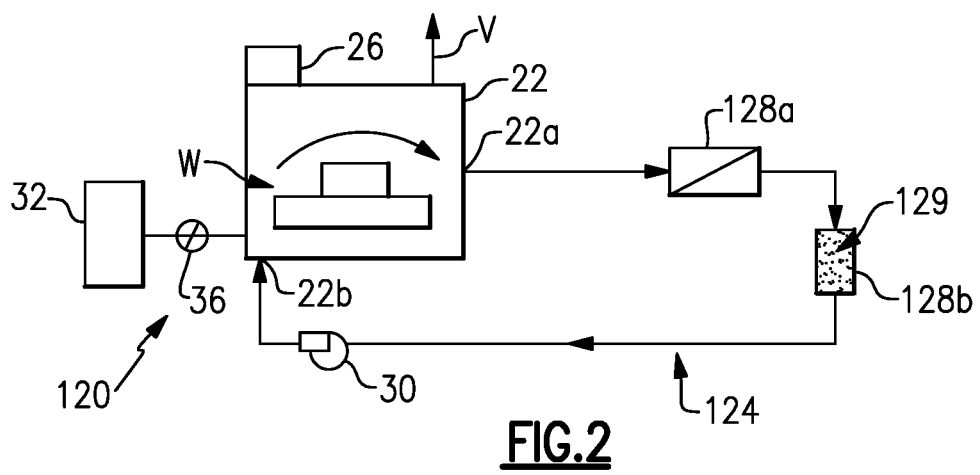
FIG. 2 illustrates a further example that includes a particle filter and a gas scrubber.

FIG. 2 illustrates a modified example of an additive processing apparatus 120. In this disclosure, like reference numerals designate like elements where appropriate and reference numerals with the addition of one-hundred or multiples thereof designate modified elements that are understood to incorporate the same features and benefits of the corresponding elements. In this example, the gas recirculation loop 124 includes at least two purification devices 128a/128b. In this example, the purification device 128a is a particle filter and the purification device 128b is a gas scrubber. The particle filter is configured to remove solid impurities from the cover gas from the chamber 22 and the gas scrubber is configured to remove gaseous impurities from the cover gas received from the chamber 22.

The particle filter is located upstream of the gas scrubber with respect to flow of the cover gas through the gas recirculation loop 124 from the outlet 22a to the inlet 22b. Thus, prior to the cover gas being received into the gas scrubber 128b, particles are removed from the cover gas to avoid or reduce fouling of the gas scrubber.

In a further example, the gas scrubber includes granules 129 of a material that can remove gaseous impurities from the cover gas. For example, the granules 129 can be a molecular sieve material, an active carbon material, or the like. In a further example, the granules 129 can additionally or alternatively include an adsorbent to remove the gaseous impurities from the cover gas. In a further example, additionally or alternatively, the granules 129 can include a catalytic material that is reactive with respect to target gaseous impurities in the cover gas to thereby trap the target gaseous impurities and remove them from the cover gas.

Example sieve materials can include activated carbon and activated alumina. Examples of activated alumina can include BASF F-200, Selexsorb CD & Selexsorb COS.

Example adsorbents and catalyst materials can include manganese, titanium, copper, and combinations thereof. The manganese, titanium, and copper are reactive with oxygen or moisture to form solid oxides and thus remove oxygen and moisture from the cover gas. One example copper catalyst is BASF R3-11G. Additional catalyst examples are shown in the table below.

| Catalyst | Main Constituents | Contaminants Removed |
| --- | --- | --- |
| BASF R0-20 (3) | Pd on $Al_2O_3$ | $O_2$, $H_2$, CO, acetylenes, dienes, olefins, VOC's |
| BASF R0-25 (3) | Pd on $Al_2O_3$ | Same as R0-20/47 |
| BASF R3-11 (3) | CuO & Mg—Si | Special $O_2$-getter for Indicating $O_2$ Traps |
| BASF R3-11G (3) | CuO & Mg—Si | Oxygen from gases & liquids (regenerable) |
| BASF R3-12 (3) | $CuO_+$ ZnO & $Al_2O_3$ | Arsine, phosphine, $H_2S$, COS, RSH |
| BASF R3-15 (3) | $CuO_+$ ZnO & $Al_2O_3$ | Oxygen from gases & liquids (regenerable) |
| BASF R3-16 (3) | $CuO_+$ ZnO & $Al_2O_3$ | Oxygen & CO from ethylene (primarily for PE/PP units) |
| Engelhard Cu-0226S | CuO on $Al_2O_3$ | Oxygen from gases & liquids (regenerable). See note 4. |
| Engelhard DEOXO | Various PMs Types | Various gas purifications. |
| Engelhard Ni-3288 | NiO on support | Oxygen from specialty gases |
| Engelhard Q-5 | CuO on $Al_2O_3$ | Oxygen from gases & liquids (regenerable). |
| RC1 GetterMax 133T | $CuO_+$ ZnO & $Al_2O_3$ | $O_2$ from gases & liquids (regenerable) |

For example, R0-20/47 is 0.47 wt % Pd on 2-4 mm beads. R0-25 is supported on highly calcined extrudates (3 mm, 4 mm or 6 mm) and can have Pd loadings of 0.15%, 0.3% or 0.50%, for use if temperatures exceed about 600° C., or low pressure drop is needed. The Engelhard DEOXO catalysts include a range of supported precious metals catalysts using Pd, Pt, Rh and/or Ru on alumina supports.

In a further example, the granules 129 of the gas scrubber can be in a bed, such as a packed bed that is contained within a column, housing, or other structure, to avoid or reduce the chance that the granules or portions thereof are released into the cover gas and foul downstream components. In one further example, the containment structure is insulated and includes a heater that is operable to selectively heat the bed for regeneration. During regeneration, a reducing gas can be used to reduce oxidized scrubber species, such as copper oxide, and to carry away moisture. The direction of gas flow through the gas scrubber during regeneration can be opposite the direction of flow through the gas scrubber during use to remove impurities.

Additionally, the particle filter 128a, the gas scrubber 128b, or both, can be removable and/or regenerated and reused. For example, the gas scrubber 128b can be removed from the additive processing apparatus 120, regenerated, and then returned into the additive processing apparatus 120 for further use.

Figure 3:
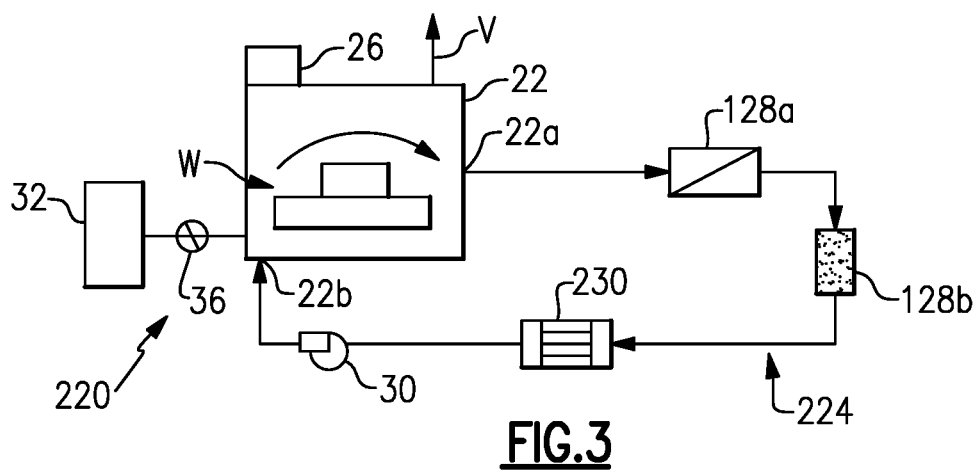
FIG. 3 illustrates another example that includes a heat exchanger.

FIG. 3 shows another modified example of an additive processing apparatus 220. The additive processing apparatus 220 is similar to the apparatus 120 except that the gas recirculation loop 224 also includes a heat exchanger 230. In this example, the heat exchanger 230 is located downstream from the gas scrubber 128b with respect to flow through the gas recirculation loop 224. Thus, after removal of particle impurities and gaseous impurities from the cover gas, the heat exchanger can be utilized to cool the clean cover gas prior to reintroduction into the chamber 22. The temperature of the clean cover gas provided back into the chamber 22 can be controlled to facilitate control over the processing temperature in the chamber 22 during an additive manufacturing process. Alternatively or additionally, a heat exchanger could be provided upstream of the particle filter 128a and/or between the particle filter 128a and the gas scrubber 128b.

For example, if the cover gas temperature exceeds the use temperature of the particular particle filter 128a or gas scrubber 128b, one or more heat exchangers can additionally or alternatively be included to cool the cover gas prior to the particle filter 128a or the gas scrubber 128b. For instance, adsorbents, such as a molecular sieve for moisture capture, have higher sorption capacity near room temperature. However, impurity particulates can build-up on the heat exchanger surfaces. To reduce or avoid such build-up, the heat exchangers can be oriented vertically so that any particulates will fall into a dropout pot. Other scrubbers may function at higher temperatures to promote reactions, and thus not need cooling of the cover gas. For example, titanium reacts with nitrogen at elevated temperatures to form titanium nitride.

Figure 4:
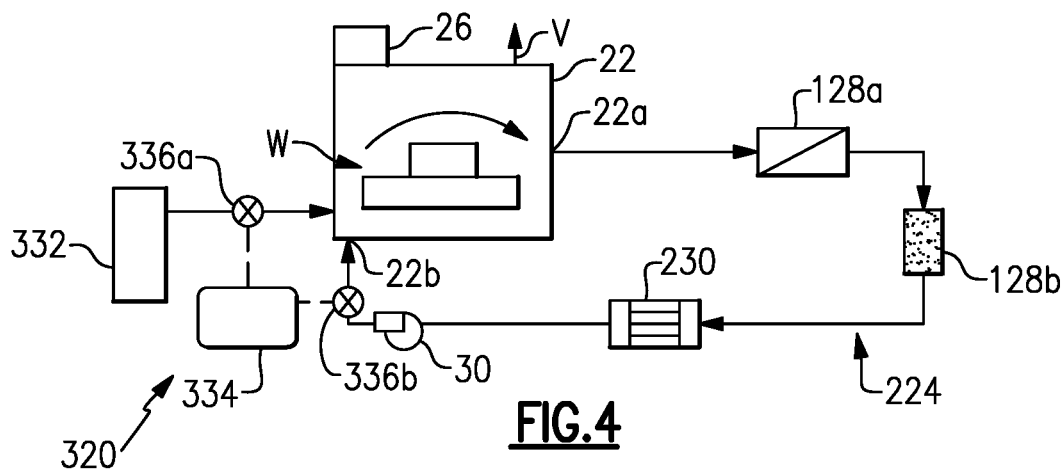
FIG. 4 shows another example that includes a cover gas source and a controller for metering an amount of new cover gas provided into a chamber.

FIG. 4 illustrates another modified example of an additive processing apparatus 320 that is somewhat similar to the apparatus 220 but also includes a cover gas source 332 and a controller 334. The cover gas source 332 is connected to the chamber 22 for providing new cover gas into the chamber as needed. The new cover gas can be provided directly into the chamber 22, as shown, or introduced into the gas recirculation loop 224. In this regard, the connection between the cover gas source 332 and the chamber 22 includes a metering valve 336a. The controller 334 is in communication with the metering valve 336a and can thus control or meter the amount of new cover gas provided into the chamber 22 during an additive manufacturing process. The controller 334 is also in communication with the gas recirculation loop 224 to monitor flow, pressure, or the like for determining or regulating the amount of clean cover gas provided back into the chamber 22 by controlling blower 30 and metering valve 336b. Typically, if the blower 30 is used for regulation, the metering valve 336b will not be needed.

During an additive manufacturing process, cover gas can be vented through a valve, as shown at V, from the chamber 22 to facilitate controlling the pressure and internal conditions within the chamber 22. Thus, cover gas can be lost during the additive manufacturing process. In this regard, the controller 334 can also be in communication with the vent, V, to monitor and control how much cover gas is vented from the chamber 22. The controller 334 can then control the amount of the new cover gas (i.e., make-up gas) provided from the cover gas source 332 with respect to the amount of clean cover gas circulated back into the chamber 22 from the gas recirculation loop 224 to maintain pressure in the chamber 22 to be within a target range. The controller 334 can include software, hardware, or a combination thereof that is programmed for such functions.

Figure 5:
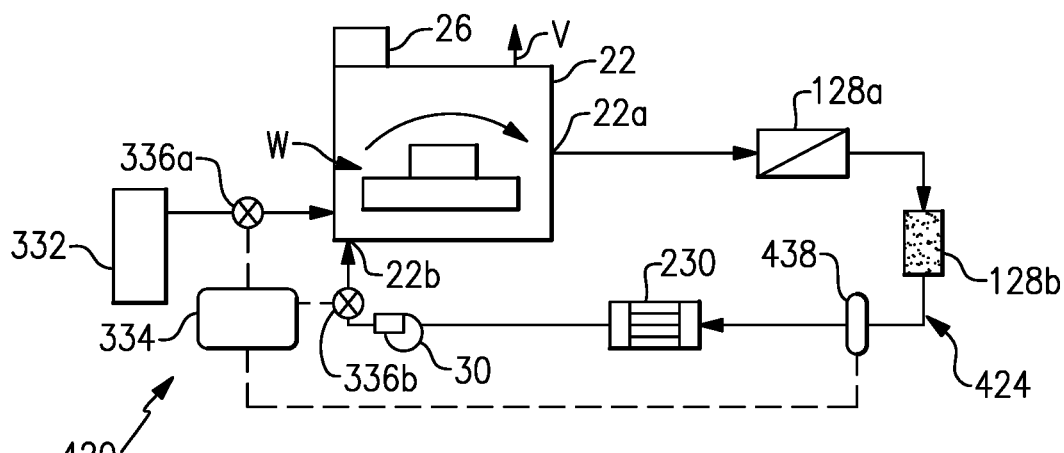
FIG. 5 shows another example that includes at least one sensor in the gas recirculation loop.

FIG. 5 illustrates a modified example of another additive processing apparatus 420. In this example, the apparatus 420 is somewhat similar to the apparatus 320 but also includes at least one sensor 438 in the gas recirculation loop 424. The sensor or sensors 438 are configured to detect a characteristic that is representative of the impurity level of the clean cover gas in the gas recirculation loop 424. In this regard, at least one of the sensors 438 is located downstream from at least one purification device. In this example, the sensor 438 is located downstream from the particle filter 128a and the gas scrubber 128b. For example, the sensor is configured to detect oxygen level, moisture level, or other gas level indicator which can be used to indicate the impurity level of the clean cover gas. For instance, if there is a malfunction in one or more of the purification devices or the purification device reaches its capacity limit, the sensor can detect a rising impurity level and thus alert a user. The impurity level may also or alternatively be used to control the circulation rate of the cover gas through the gas recirculation loop 424.

Figure 6:
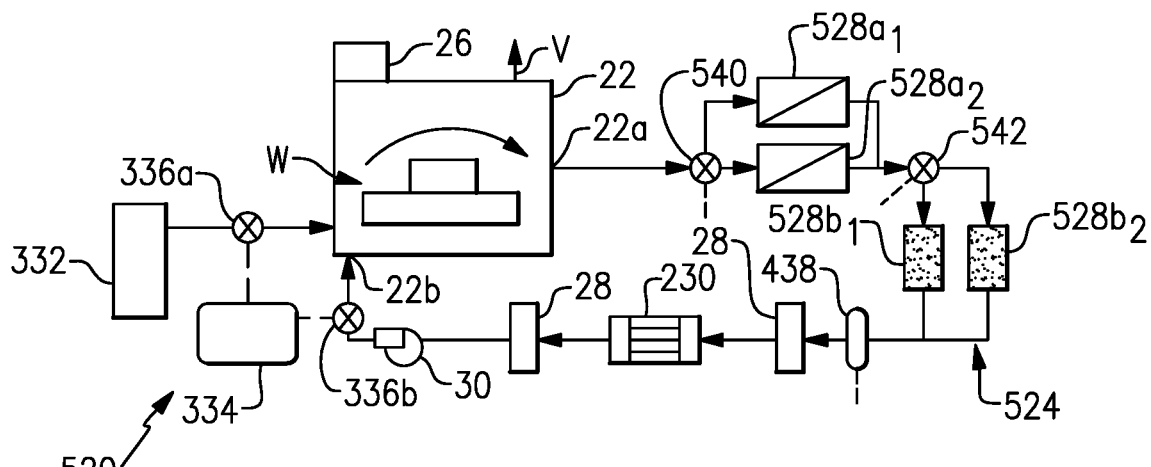
FIG. 6 illustrates a further example in which a gas recirculation loop includes at least one split for using several purification devices.

FIG. 6 shows another modified example of an additive manufacturing apparatus 520 that again is somewhat similar to the apparatus 420. In this example, the gas recirculation loop 524 includes one or more splits that enable the use of several purification devices. For example, the cover gas can be directed to one of the purification devices while the other is being changed or regenerated, and then subsequently directed to the other purification device while the first purification device is being changed or regenerated. The changing or regeneration can be manual, automatic, or semi-automatic. Thus, in this example, the gas recirculation loop 524 includes two particle filters $528a_1$ and $528a_2$ that are arranged in the split. A valve 540 may be provided at the split to control which of the particle filters $528a_1$ or $528a_2$ the cover gas flows to.

Additionally or alternatively, a split can be provided for several gas scrubbers. As an example, the gas recirculation loop 524 also includes a split for a first gas scrubber $528b_1$ and a second gas scrubber $528b_2$. Similarly, a valve 542 is provided upstream of the gas scrubbers $528b_1$ and $528b_2$ for controlling which of the gas scrubbers the cover gas flows to. Similar to the particle filters, the cover gas can be directed to one of the gas scrubbers while the other is being changed or regenerated, and then subsequently directed to the other gas scrubbers while the first is being changed or regenerated. The changing or regeneration can be manual, automatic, or semi-automatic. Additionally, the valves 540 and 542 can be connected to the controller 334 for controlling the operation thereof. Alternatively, the valves 540 and 542 can be manually operable. Each split combines back into the gas recirculation loop 524 downstream of the purification devices.

In this example, the gas recirculation loop 524 also includes one or more additional purification devices 28. For example, one or more additional purification devices 28 can be provided downstream of the gas scrubber or scrubbers to remove any particles that may become entrained in the cover gas from the granules in the gas scrubber. The additional purification device, such as a particle filter or HEPA filter, can be provided prior to the heat exchanger 230 and, optionally, another purification device, such as another particle filter or HEPA filter, can be provided downstream of the heat exchanger 230.

In one further modification, there will be an initial bulk particle filter (e.g., 128a in FIG. 5) for removing the largest particles, followed by a fine particle filter and/or HEPA filter for removing smaller or submicron particles. The bulk particle filter can include a dropout pot having a container with an inlet pipe through which the gas and particulates enter. The large particles and gas travel downward and the large particles drop out when the gas changes direction and travels upward to an outlet. Such as device could alternatively also be a cyclone. The gas with fine particles will then travel to the filter element where the gas needs to pass through the filter and the particles stick to the outside of the filter surface (and some penetrate). These small particles form a filter cake. That filter cake can be broken up and released from the filter by a pressure backpulse. The filter cake then drops to the bottom where it can be collected.

A first gas scrubber follows the fine particle filter and/or HEPA filter, to remove gas impurities that can foul a second downstream gas scrubber. For example, the second gas scrubber includes a catalyst or molecular sieve that removes oxygen/moisture and the first gas scrubber includes activated carbon that removes gases such as nitrogen, methane, and carbon oxides that can hinder the catalyst or molecular sieve from removing the oxygen/moisture. A hot getter at approximately 400-1000° C. can be provided downstream from the second gas scrubber to further remove remaining trace gas species, such as carbon oxides, methane, nitrogen, oxygen, and ammonia, which may otherwise influence the additive fabrication.

The examples discussed above also represent an additive processing method. Such a method can include providing the cover gas to the chamber 22 in connection with an additive fabrication of an article in the chamber 22. The cover gas entrains impurities during the additive fabrication and is then circulated with the entrained impurities from the chamber 22 into the gas recirculation loop 24/124/224/424/524. The entrained impurities are then removed from the cover gas in the gas recirculation loop to generate the clean cover gas. The clean cover gas is then circulated back into the chamber 22 during the additive fabrication. As in the examples, the removal of the impurities can be conducted using a gas scrubber, a particle filter, or combinations thereof as discussed above. Additionally, the clean cover gas can then be cooled prior to circulating the clean cover gas back into the chamber 22. It is to be understood that the examples above described with respect to FIGS. 1-6 are hereby incorporated as further examples of the method, in that any or each of the functions of the components of the described examples can also represent a step or action in the method.

In one further example, the gas recirculation loop 24/124/224/424/524 is utilized after a purge process that controls the oxygen/moisture content in the chamber 22 to be below a threshold which the gas recirculation loop 24/124/224/424/524 can handle. For example, the oxygen/moisture content is lowered to below 100 part-per-million by venting used cover gas from the chamber 22 and providing new cover gas. Thus, the chamber may be used in an open-loop configuration until the level is reduced below the threshold, which then triggers activation of the gas recirculation loop 24/124/224/424/524 in a closed-loop mode. Limiting the exposure level of the gas recirculation loop 24/124/224/424/524 may serve to reduce the frequency or need for replacing or regenerating purification devices.

In one further example, lowering the oxygen/moisture level can be accelerated by providing a balloon or other expandable reservoir of cover gas in the chamber 22. The cover gas in the chamber 22 outside of the balloon must flow around the balloon into corners or other low-flow areas, to facilitate purging those areas. The balloon is then deflated and removed prior to the additive fabrication process. Depending on the particular additive fabrication process and components within the chamber 22, there may be more or less space for such a balloon.

Figure 7:
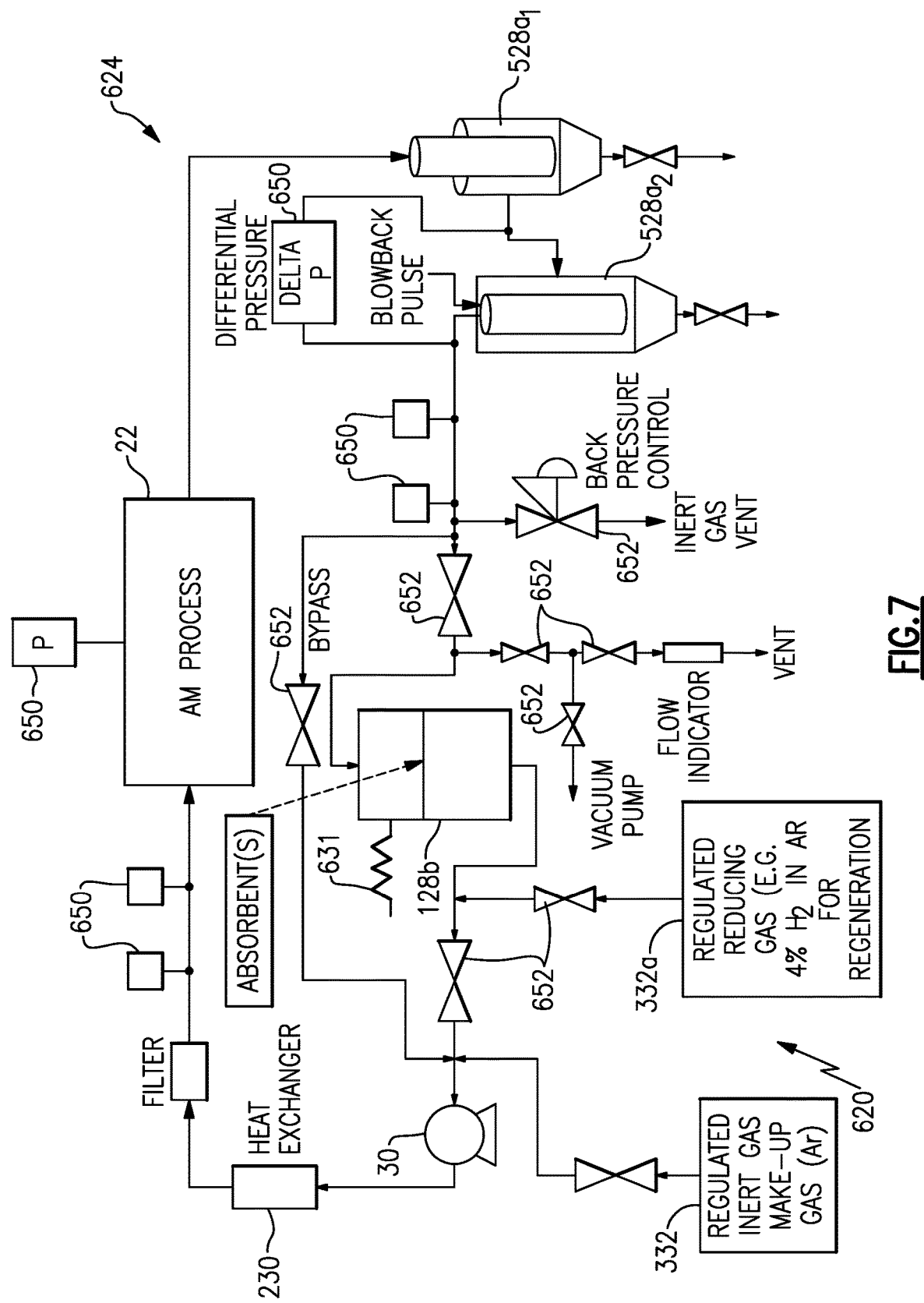
FIG. 7 illustrates a further example additive processing apparatus that includes a gas recirculation loop.

FIG. 7 shows another modified example of an additive manufacturing apparatus 620. In this example, the first particle filter $528a_1$ (shown with dropout pot, as described above) and the second particle filter $528a_2$ (shown with dropout pot, as described above) are arranged in series in the gas recirculation loop 624. The first particle filter $528a_1$ is configured to remove relatively large particles, and the second particle filter $528a_2$ is configured to remove smaller particles, with blowback pulse for continuous filtration. The gas scrubber 128b in this example includes a heater 631 and is arranged downstream from the second gas scrubber $528b_2$. In addition to cover gas source 332, there is also a reducing gas source 332a. As shown, the gas recirculation loop 624 includes a plurality of sensors, generally designated as 650, and a plurality of valves, generally designated as 652, for further monitoring and controlling the apparatus 620. One or more of the sensors is an oxygen sensor and one or more of the sensors is a water/moisture sensor. The sensor 650 from the chamber 22 is a pressure sensor. It is to be understood that any or all of the illustrated components can be in communication with a controlling having software, hardware, or both for controlling the operation thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An additive processing apparatus comprising:
   a chamber and an irradiation device together operable to additively fabricate an article from a powder layer-by-layer in a work space in the chamber;
   a gas recirculation loop connected at a first end thereof to an outlet of the chamber and at a second end thereof to an inlet of the chamber, the gas recirculation loop including at least one purification device configured to remove impurities from a cover gas and to generate a clean cover gas, wherein the gas recirculation loop includes a heat exchanger downstream of the at least one purification device with respect to flow from the first end to the second end
   a cover gas source connected to the chamber for providing new cover gas; and
   a controller configured to meter an amount of new cover gas with respect to an amount of clean cover gas circulated into the chamber from the gas recirculation loop.

2. The apparatus as recited in claim 1, wherein the at least one purification device includes a gas scrubber.

3. The apparatus as recited in claim 2, wherein the at least one purification device includes a particle filter.

4. The apparatus as recited in claim 3, wherein the particle filter is upstream of the gas scrubber with respect to flow from the first end to the second end.

5. The apparatus as recited in claim 4, further comprising an additional particle filter downstream of the gas scrubber with respect to flow from the first end to the second end.

6. The apparatus as recited in claim 2, wherein the gas scrubber includes a bed of granules.

7. The apparatus as recited in claim 2, wherein the gas scrubber includes at least one of activated carbon, magnesium, titanium, and copper.

8. The apparatus as recited in claim 2, wherein the gas scrubber includes a molecular sieve.

9. The apparatus as recited in claim 1, wherein the gas recirculation loop splits into first and second passages including, respectively, first and second purification devices, and the first and second passages combine in the gas recirculation loop downstream of the first and second purification devices with respect to flow from the first end to the second end.

10. The apparatus as recited in claim 1, wherein the gas recirculation loop includes at least one sensor downstream of the at least one purification device with respect to flow from the first end to the second end, the at least one sensor configured to detect a characteristic representative of impurity level of the clean cover gas.

11. An additive processing apparatus comprising:
   a chamber and an irradiation device together operable to additively fabricate an article from a powder layer-by-layer in a work space in the chamber, the chamber including a vent valve;
   a gas recirculation loop connected at a first end thereof to an outlet of the chamber and at a second end thereof to an inlet of the chamber and, to purify a cover gas received from the chamber and generate a clean cover gas circulated into the chamber, the gas recirculation loop including, in flow serial order from the first end to the second end, a particle filter configured to remove solid impurities from the cover gas, a gas scrubber configured to remove gaseous impurities from the cover gas, a heat exchanger operable to cool the cover gas, and a recirculation loop metering valve;
   a cover gas source and a cover gas metering valve, the cover gas source being connected through the cover gas metering valve to the chamber for providing new cover gas; and
   a controller connected with the vent valve, the recirculation loop metering valve, and the cover gas metering valve, the controller configured to operate the vent valve to vent the cover gas from the chamber through the vent valve and operate the cover gas metering valve and the recirculation loop metering valve to meter an amount of new cover gas provided into the chamber as make-up gas for the cover gas that is vented from the vent valve with respect to an amount of clean cover gas circulated into the chamber from the gas recirculation loop.

12. The apparatus as recited in claim 1, wherein the at least one purification device includes, in serial flow order, a particle filter and a gas scrubber.

13. The apparatus as recited in claim 1, further comprising a metering valve in the gas recirculation loop and a controller in communication with the metering valve and configured to regulate an amount of clean cover gas from the gas recirculation loop into the chamber.

14. The apparatus as recited in claim 11, wherein the particle filter is upstream of the gas scrubber with respect to flow from the first end to the second end.

15. The apparatus as recited in claim 14, further comprising an additional particle filter downstream of the gas scrubber with respect to flow from the first end to the second end.

16. The apparatus as recited in claim 14, wherein the gas scrubber includes at least one of activated carbon, magnesium, titanium, and copper.

17. The apparatus as recited in claim 14, wherein the gas recirculation loop includes at least one sensor configured to detect a characteristic representative of impurity level of the clean cover gas.

18. An additive processing method for fabricating an article using the additive processing apparatus as recited in claim 1, including circulating the cover gas with impurities from the chamber into the gas recirculation loop, removing the impurities from the cover gas in the gas recirculation loop using the purification device to generate the clean cover gas, circulating the clean cover gas into the chamber during the additive fabrication, and metering the amount of new cover gas with respect to the amount of clean cover gas circulated into the chamber from the gas recirculation loop using the controller.

\* \* \* \* \*